H. F. T. ERBEN & J. L. BURNHAM.
THREE WIRE GENERATOR.
APPLICATION FILED JUNE 21, 1907.
993,973.
Patented May 30, 1911.
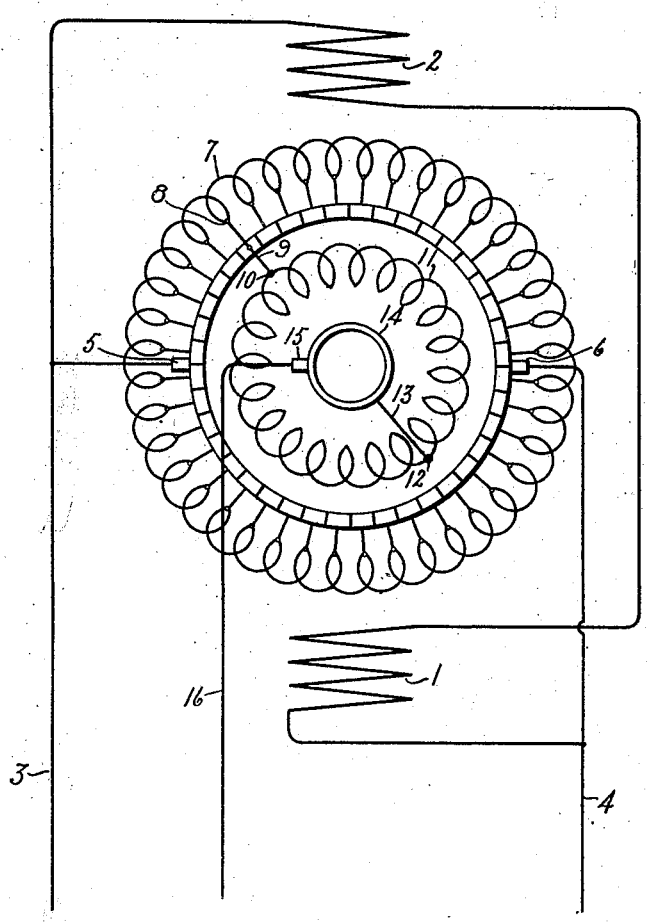
Witnesses:
George H. Tilden
J. Ellis Glen
Inventors:
Hermann F. T. Erben,
Joseph L. Burnham,
by Albert G. Davis
Att'y.

UNITED STATES PATENT OFFICE.

HERMANN F. T. ERBEN AND JOSEPH L. BURNHAM, OF SCHENECTADY, NEW YORK, ASSIGNORS TO GENERAL ELECTRIC COMPANY, A CORPORATION OF NEW YORK.

THREE-WIRE GENERATOR.

993,973.  Specification of Letters Patent.  Patented May 30, 1911.

Application filed June 21, 1907. Serial No. 380,050.

*To all whom it may concern:*

Be it known that we, HERMANN F. T. ERBEN and JOSEPH L. BURNHAM, citizens of the United States, residing at Schenectady, county of Schenectady, State of New York, have invented certain new and useful Improvements in Three-Wire Generators, of which the following is a specification.

This invention relates to dynamo-electric machines and more particularly to generators for supplying three-wire systems in which it is desirable to maintain a constant difference of potential between the intermediate or neutral wire and the two outside wires of the system.

The object of our invention is to provide a generator for three-wire systems which will maintain a constant or steady difference of potential between the intermediate wire and the outside wires of a three-wire system, even at slow speed, which requires only one collector ring, and which is an improvement on three-wire generators heretofore used.

In carrying out our invention we maintain a constant difference of potential between the outside wires of a three wire system by means of a main armature winding which is preferably connected to said wires through a commutator. The neutral is connected to the main winding in order to complete the circuit from either of the outside wires through the neutral, and the difference of potential between the neutral and either of the outside wires is maintained constant by connecting a point on the main winding subjected to the maximum fluctuations of potential produced in said winding to the neutral through a continuous auxiliary winding closed upon itself and generating a different electromotive force than the main winding, with one point connected to a collector ring, for producing fluctuations of voltage which will combine with the fluctuations of voltage from said point on the main winding to maintain a constant voltage on the collector ring.

The potential of the point on the main winding which is connected to the neutral through the auxiliary winding rises to the maximum maintained between the outside wires, and dies down again to zero. The connections to the auxiliary winding, which generates a potential one-half that of the main winding, are so arranged that the maximum potential of the point on the main winding is opposed by the maximum potential of the auxiliary winding so that the net potential on the neutral is the difference, or one-half the potential of the main winding; when the potential of the point on the main winding dies down to zero, the neutral is supplied with the maximum voltage of the auxiliary winding, which is one-half that of the main winding. At intermediate points the potentials from the two windings combine to maintain a constant difference of potential between the wires.

The connections are simplest in a bipolar generator, but the invention may be embodied in a multipolar generator without any other changes than additional connections between the two windings and between the auxiliary windings and the collector ring. A bipolar or a multipolar generator embodying our invention has a commutator connected to the main winding for supplying the outside wires, and a single collector ring connected to the neutral wire and maintains a constant difference of potential between the wires of the system even at slow speeds, so that the generator can be used to supply lighting systems when run at any desired speed.

Our invention will best be understood in connection with the accompanying drawing which is merely an illustration of one embodiment of our invention and which shows a diagrammatic representation of one form of generator embodying our invention.

The drawings illustrate the simplest form of generator having a magnetic field produced by two windings 1 and 2 connected in shunt across the outside wires 3 and 4 of a three-wire system. These wires are supplied from the main armature winding through brushes 5 and 6 connected to the wires and bearing upon a commutator connected to the main winding 7, which maintains the difference of potential between the outside wires. On the winding 7 a point 8, the potential of which varies during each revolution from zero to the maximum generated by the main winding, is connected by a wire 9 to a corresponding point 10 on a continuous and uninterrupted auxiliary winding 11 closed upon itself, as shown in the drawing, to form a winding similar to the main winding. As shown in the diagram, the auxiliary winding 11 is rigidly connected to the main armature winding 7 and rotates in the same magnetic field produced by the windings 1 and 2, and the corresponding points 8 and 10 on the main and auxiliary windings reach positions of maximum and of minimum voltage at the same instant. The construction shown in the diagram is convenient, but the details of structure are immaterial so long as the variations in voltage of the points 8 and 10 are in phase with each other. The auxiliary winding 11 has one-half the number of turns of the main winding 7, hence the voltage generated by the auxiliary winding is one-half that generated by the main winding. A point 12 on the auxiliary winding which, in the bipolar generator shown in the drawing, is diametrically opposite to point 10, is connected through a wire 13 to the collector ring 14 which supplies, through a brush 15, the intermediate or neutral wire 16. The difference of potential between the points 10 and 12 on the winding 11 is the maximum potential generated by the winding 11.

The principle illustrated in the drawing may be equally well applied to machines having several pairs of poles and differing greatly in structure, so long as the connections between the windings and the collector ring are arranged so that the varying voltages of the different windings bear the same relation to each other as in the machine illustrated in the drawing.

The voltage of the point 8 on the main armature winding varies from zero to the maximum potential generated by the main winding, and the auxiliary winding 11, with its connections to the collector ring 14 and to the point 8 on the main winding, constitutes a device between the main winding and the neutral for generating an electromotive force, varying with the same frequency as the varying electromotive force appearing at the point 8 of the main winding. The electromotive force generated by the auxiliary winding is of the same frequency as that at the point 8 of the main winding, but differs therefrom in magnitude, since the auxiliary winding generates only one-half the voltage of the main winding, and also in phase, since the connections are such that the electromotive force appearing at the point 12 on the auxiliary winding is directly opposed to the electromotive force appearing at the point 8 of the main winding.

The operation of the generator is as follows: If it be assumed that the point 8 of the main winding is at maximum potential when under the brush 5, the diametrically opposite point of the main winding, in engagement with the brush 6, is at zero potential. The auxiliary winding is in the same field as the main winding, and at this time the point 10 on the auxiliary winding is at the same potential, as the point 8, while the point 12 on the auxiliary winding is at one-half the difference of potential between the outside wires of the system. The potential of the auxiliary winding is opposed to the potential of the main winding and the net result is that the collector ring 14 is maintained at a potential equal to the difference between the potentials generated by the auxiliary winding and the main winding, which is one-half the difference of potential between the outside wires of the system. If the armature makes one-half a revolution, the potential of the point 8 on the main winding, and of the corresponding point 10 on the auxiliary winding, dies down to zero by the time the point 8 reaches the brush 6, while the potential of the point 12 on the auxiliary winding increases from zero to its maximum, one-half the difference of potential between the outside wires of the system. At this time, therefore, all the potential supplied to the collector ring 14 comes from the auxiliary winding, since the point 8 on the main winding is at zero potential and does not modify in any way the action of the auxiliary winding. At intermediate points of the revolution, the varying potentials of the point 8 and of the auxiliary winding combine in such a manner that the net result is a constant potential on the collector ring 14.

For simplicity, a bipolar generator has been illustrated and described, but it is evident to those skilled in the art that our invention is not limited to a bipolar machine, and reference in the specification and claims to "diametrically opposite" points on the auxiliary winding, means points electrically diametrically opposite; that is, spaced 180 electrical degrees or some odd multiple thereof apart.

In the appended claims we intend to cover all changes and modifications which are within the spirit and scope of our invention.

What we claim as new and desire to secure by Letters Patent of the United States, is,—

1. In a generator, the combination with three leads, of a main armature winding for supplying two of said leads, a continuous auxiliary winding closed upon itself and generating a different electromotive force than the main winding and having different points connected to said main winding and to the third lead to maintain a constant difference of potential between the third lead and the other two.

2. In a generator for three-wire systems, the combination with a main armature winding for supplying the outside wires, of a continuous auxiliary winding closed upon itself and generating half the electromotive force of the main winding with different points on said auxiliary winding connected to said main winding and to the neutral to maintain a constant difference of potential between the outside wires and the neutral.

3. In a generator, the combination with three leads, of a main armature winding for supplying two of said leads, a continuous auxiliary winding closed upon itself and generating a different electromotive force than the main winding, and means for supplying the third lead connected to said auxiliary winding at a point differing in potential from a point on said auxiliary winding which is connected to the main winding.

4. In a generator for three-wire systems, the combination with a main armature winding for supplying the outside wires, of a continuous auxiliary winding closed upon itself and generating half the electromotive force of the main winding, a connection between corresponding points of said windings, and means for supplying the neutral connected to said auxiliary winding at a point differing in potential from the point connected to the main winding by the maximum electromotive force generated by the auxiliary winding.

5. In a generator, the combination with three leads, of a main winding connected to two of said leads, a continuous auxiliary winding closed upon itself in the same field as the main winding and rigidly connected thereto, said auxiliary winding generating half the electro-motive force of the main winding, a connection between corresponding points of said windings, and means for supplying the third lead connected to the auxiliary winding at a point electrically diametrically opposite the point connected to the main winding.

6. In a generator, the combination with three leads, of a main armature winding having a commutator for supplying two of said leads, a continuous auxiliary winding closed upon itself and moving in the same field as the main winding and rigidly connected thereto, said auxiliary winding having one-half the number of turns of the main winding, a connection between corresponding points of said windings, a collector ring in engagement with the third lead, and a second connection between said ring and said auxiliary winding at a point electrically diametrically opposite the point connected to the main winding.

7. In a generator, the combination with three leads, of a main winding having a commutator for supplying two of said leads, a continuous auxiliary winding on said armature closed upon itself and generating a different electro-motive force than the main winding, said auxiliary winding being connected to a collector ring for the third lead at one point and connected at another point electrically diametrically opposite the first to a corresponding point on the main winding.

In witness whereof, we have hereunto set our hands this 19th day of June, 1907.

HERMANN F. T. ERBEN.
JOSEPH L. BURNHAM.

Witnesses:
 BENJAMIN B. HULL,
 HELEN ORFORD.

---

Copies of this patent may be obtained for five cents each, by addressing the "Commissioner of Patents, Washington, D. C."